United States Patent [19]

Borsuk

[11] 4,205,896
[45] Jun. 3, 1980

[54] METHOD AND APPARATUS FOR FIXING THE ROTATIONAL POSITIONS OF ECCENTRIC ELEMENTS IN AN OPTICAL FIBER CONNECTOR

[75] Inventor: Leslie M. Borsuk, Los Alamitos, Calif.

[73] Assignee: International Telephone and Telegraph Corporation, New York, N.Y.

[21] Appl. No.: 973,899

[22] Filed: Dec. 28, 1978

[51] Int. Cl.² ............................................... G02B 5/14
[52] U.S. Cl. ............................... 350/96.20; 350/96.21
[58] Field of Search ............... 350/96.20, 96.21, 96.22; 339/270 R, 274, 276 R

[56] References Cited

U.S. PATENT DOCUMENTS

| 3,800,388 | 4/1974 | Börner | 350/96.21 |
| 3,936,143 | 2/1976 | Sato | 350/96.21 |
| 3,938,895 | 2/1976 | Bridger et al. | 350/96.20 |
| 4,019,806 | 4/1977 | Fellows | 350/96.21 |
| 4,146,300 | 3/1979 | Kaiser | 350/96.21 |

Primary Examiner—Stewart J. Levy
Attorney, Agent, or Firm—Thomas L. Peterson

[57] ABSTRACT

An optical fiber connector assembly using eccentric ferrule centering means for adjusting the concentricity of the optical fiber interface end with respect to the connector body perimeter. The eccentric ferrule or ferrules are in the form of elongated sleeves with the innermost sleeve extending from the connector body end the greatest amount. An external crimp sleeve of a relatively soft malleable metal has a generally conical shape with internal step-tapered diameter to fit over the eccentric ferrule exposed ends. Once the concentricity alignment of the optical core has been effected by relative rotation of the eccentric ferrule members (sleeves), crimping of the soft metal sleeve to each eccentric sleeve exposed extremity fixes the relative rotational position of these ferrules preserving the concentric alignment of the optical fiber in the connector body.

10 Claims, 3 Drawing Figures

METHOD AND APPARATUS FOR FIXING THE ROTATIONAL POSITIONS OF ECCENTRIC ELEMENTS IN AN OPTICAL FIBER CONNECTOR

BACKGROUND OF THE INVENTION

1. Field of the Invention

The invention relates to optical fiber connectors generally, and more specifically to means for "fixing" the relative rotational position of the eccentric sleeves of an eccentric ferrule optical fiber connector.

2. Description of the Prior Art

Optical fiber connectors having one or more eccentric ferrules, one over the other, with the outer one rotatably mounted within an eccentric axial bore through the body of the connector are known per se. U.S. Pat. No. 3,936,143 describes such a connector arrangement with pin means for rotationally "fixing" each ferrule with respect to the others once an adjustment has been effected. The eccentric ferrules or sleeves are called collars in that reference. Since the relative positions of the eccentric sleeves are not known until the adjustment has been empirically accomplished, a bore for accepting the pin can obviously not be provided in advance except in the outer sleeve or collar. Beyond that, drilling in place to extend the pin accepting bore into at least the next innermost of the sleeves would appear to be necessary. That procedure is of itself relatively inconvenient and cumbersome.

U.S. Pat. No. 3,800,388 suggests clamping or locking such eccentric sleeves in place by temperature shrinking, the use of guide pins, soldering, welding, clamping or gluing. The connector bodies for the optical fibers aforementioned are very often fabricated from stable plastic materials and are accurately manufactured. Accordingly, soldering and welding are not available alternatives, nor is the "shrink fitting" method applicable. Clamping might be employed, however, clamping devices are frequently more cumbersome and larger than the apparatus they are intended to clamp, and gluing or cementing implies a drying or setting time, however, relatively small that may be.

It should be borne in mind that the typical optical fiber to be connected in a fiber optic connector arrangement is a hairlike element a few thousandths in diameter including core and cladding. Accordingly, the "fixing" or locking problem remains only marginally solved in the prior art.

An approach to the general problem of optical fiber coupling based on a somewhat different principal is illustrated in U.S. Pat. No. 4,019,806. That reference could not be considered to be a dismountable connector arrangement, however, and is otherwise not germane.

German Pat. No. 2,358,785 employs the eccentric sleeve principal with a somewhat different apparatus for locking the movable components in place, that apparatus would not, however, appear to be convenient or easily applied in the field.

In view of the state-of-the-art for locking or fixing eccentric sleeve members in the type of optical connectors aforementioned, there would appear to be a substantial need for a simple, inexpensive means for accomplishing such locking or fixing. Such a means should be simple, inexpensive and quickly and easily applied in the field with simple tools, since optical fiber systems are beginning to be used and are expected to be much more extensively used in the future.

The manner in which the present invention addresses the disadvantages of the prior art to provide a novel structure and approach to the problem will be evident as this description proceeds.

SUMMARY

According to the invention, an eccentric ferrule connector is constructed as hereinbefore described. A connector part or half with eccentric ferrule adjustments is essentially a prior art device except that ferrules of the invention at the end of the connector opposite the interface end has these ferrules in staggered relationship lengthwise. The innermost of these is the longest whereas the outer most is the shortest. A crimp sleeve is provided which has the stepped conical interior shape corresponding to the shape produced by the staggered eccentric ferrules. Slipped over the exposed ferrule end of the connector part, the crimp sleeve provides means for "fixing" or locking the ferrules in relative rotational positions determined after an alignment procedure is applied to center the core with respect to the shell of the connector body.

The crimp sleeve, which is preferably made from a malleable, relatively soft, metal is readily deformed against the extended ferrules by means of a simple tool opposite each extended portion of the corresponding eccentric ferrules. The details of the invention are hereinafter described with respect to the drawings.

DETAILED DESCRIPTION

Figure 1:
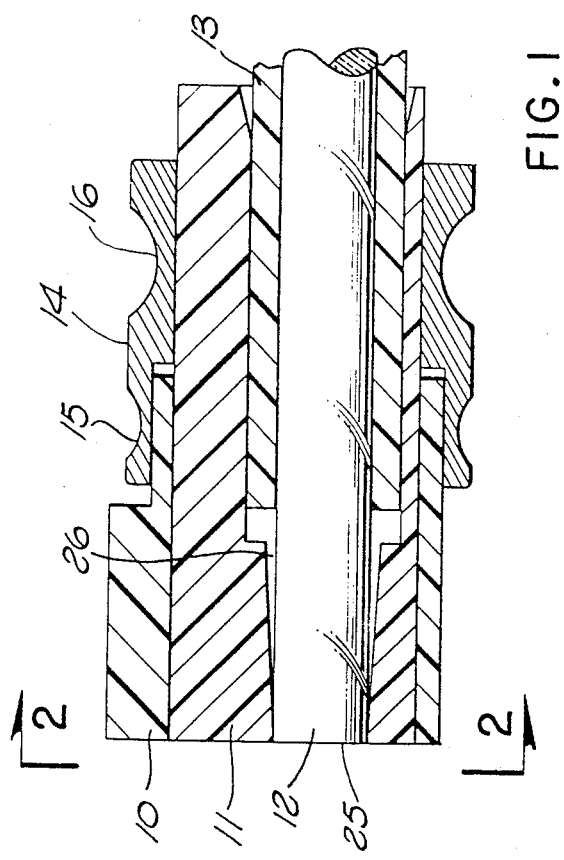
FIG. 1 is an axially-sectioned view of a first embodiment according to the invention for a single, eccentric ferrule arrangement.
Figure 2:
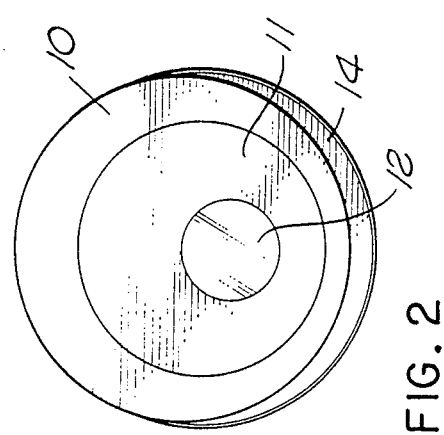
FIG. 2 is an end view of the interface surface of the connector body with eccentric ferrule and optical fiber in place as in FIG. 1.

Referring now to FIG. 1, a single eccentric ferrule connector assembly is shown, axially sectioned, having a single eccentric sleeve or ferrule 11 rotatably mounted in an eccentrically placed axial bore in a connector body 10. An optical fiber 12 is, in turn, contained within an eccentric bore in the ferrule part 11. This relationship is more clearly presented in FIG. 2 which is an end view of the apparatus of FIG. 1 showing the interface surface thereof. In referring to an interface surface, it is to be understood that this refers to the surface which would be in contact with the corresponding interface surface of another connector part or for that matter of some other device requiring accurate lateral alignment of the optical fiber with respect to the connector body perimeter.

In FIG. 1 it will be noted that the optical fiber 12 fits into the eccentric bore in the ferrule part 11 with relatively little radial clearance at the interface surface 25 whereas that bore in the ferrule part 11 is tapered as shown at 26. This tapering or expansion of the bore diameter as a function of the dimension away from the interface surface 25 accommodates optical fiber tolerances in assembly. Without this taper 26, the installation of the optical fiber 12 in the ferrule 11 would be very difficult. Once the optical fiber is installed, it is common practice to fill any voids with a resin such as one of the well known epoxy resins. Variations from concentricity at the widest part of this taper 26 are essentially of no importance, the concentricity of the fiber with the outer diameter of the connector body part 10 at the interface surface 25 being the only functionally important concentricity consideration. Obviously, through adjustment rotationally of the ferrule part 11 within the connector body part 10, adjustment is possible in that regard.

In FIG. 1 the jacket of the optical fiber 13 is accommodated within a counterbore in the ferrule part 11 as indicated. Both the body part 10 and the ferrule 11 may advantageously be fabricated from plastic materials such as polyamids or polyesters. A well known polyamid is available under the name nylon (a trademark of E. I. DuPont de Nemours Company). A well known polyester material suitable for the use is available under the name Valox (a trademark of General Electric Company). Those materials are stable and easily injection molded to accurate dimensions and with good surface finish. The inherent surface lubricity of such materials provides relative rotatability as for example between 10 and 11 in FIG. 1, even with close tolerance fits. A good fit is obviously a requirement in that regard.

As previously indicated empirically determined concentricity (lateral alignment) adjustments can be made and once these have been determined, it is necessary to fix or lock the parts in their relative rotational position. According to the invention, a crimp sleeve 14 of a mallable metal such as soft copper, aluminum or even lead can be suitable for this function. The sleeve 14 may be actually in place during assembly, but the crimps 15 and 16 are obviously not applied until after adjustment. The purpose of the crimps 15 and 16, which may be dimples applied at 180° spacing about the perimeter of the sleeve, or preferably about an arc including most or all of the perimeter of the crimp sleeve, is to lock the ferrule parts in an adjusted relationship. Tools for such crimping are commonly available or easily fabricated within the ordinary mechanical skills. Many forms of hand held crimping tools for particular purposes have been used for electrical assemblies and installation.

It will be realized that in view of the eccentricity of the bore in connector body 10 into which the ferrule 11 is fitted, the initial fit of the crimp sleeve 14 is relatively loose especially where the crimp 15 is to be applied.

Figure 3:
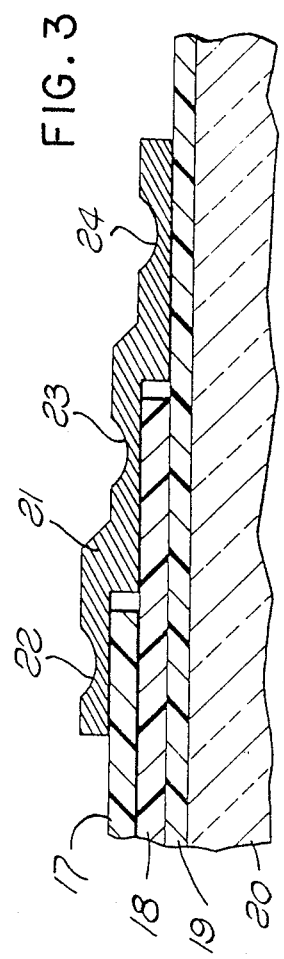
FIG. 3 is an axially-sectioned view of a second embodiment including two eccentric ferrules with corresponding crimp sleeve according to the invention.

Referring now to FIG. 3, a double-eccentric ferrule embodiment is illustrated in addition to the connector body 17, two eccentric ferrules 18 and 19 are provided. This configuration provides additional freedom of adjustment based on the principles outlined in the aforementioned U.S. Pat. No. 3,936,143, and otherwise known in this art. In FIG. 3 the optical fiber 20 is contained within an eccentric bore in the inner ferrule 19 which itself is contained in an eccentric bore in ferrule 18. Still further, 18 may be contained in an eccentric bore in the connector body 17. It will be seen that the end of this arrangement opposite the inner face surface is a stair-step configuration (in section). That is, ferrule 19 has the greatest length (to the right as illustrated in FIG. 3) whereas ferrule 18 and the body part 17 are successively of lesser lengths.

A crimp sleeve 21 is required in the shape illustrated in FIG. 3, permitting three crimp locations 22, 23 and 24. Material considerations and other aspects of the embodiment of FIG. 3 are equal or equivalent to those set forth in connection with FIG. 1.

It will be realized by those skilled in this art that the crimping operation could be accompanied by localized heating to effect a tighter grip against the connector body and extended ferrules, however, the use of a suitably malleable metal for the crimp sleeve normally makes heating uncessary. Once the parts of the assembly are fixed with respect to each other as described, there are normally no significant torsional forces encountered in use which might disturb the alignment. In special situations, where extra resistance to torsional force applied to the cable itself might be necessary, supplementary clamping over the fiber optic cable itself can be employed.

Variations and modifications on the embodiment disclosed will suggest themselves to those skilled in this art, once the inventive concept is understood. Accordingly, it is not intended that the drawings or this description should be regarded as limiting the scope of the invention. The drawings and this description are intended to be typical and illustrative only.

What is claimed is:

1. In a device for mechanically mounting and centering an elongated member of circular cross-section concentrically within a predetermined portion of said device having a circular cross-sectional shape, the combination comprising:

an assembly of eccentric sleeve members having eccentric axial bores therethrough, said sleeves being of graduated diameters and arranged in an order with the outside diameter of one slip fitting within said bore of the next largest of said sleeves, said elongated member being fitted within the bore of the innermost of said sleeves such that relative rotation of said sleeves can produce movement of the centerline of said elongated member in at least one lateral coordinate for effecting said centering;

first means extending said eccentric sleeves beyond an end of the body of said device, the amount of extension being greatest for the innermost sleeve, reducing step-wise for each such sleeve outward therefrom thereby to form a plurality of axially extending steps;

and second means comprising a crimp sleeve of malleable material having an interior shape fitting loosely over said sleeve steps of said first means, said crimp sleeve being inwardly deformed at selected locations opposite each of said first means steps thereby locking said eccentric sleeve members in their relative rotational positions.

2. Apparatus according to claim 1 in which said elongated member of circular cross-section is an optical fiber and said first means comprises a corresponding integral extension of each of said eccentric sleeves.

3. Apparatus according to claim 1 in which said inward deformation of said crimp sleeve is effected at least at one location about the perimeter of said crimp sleeve corresponding to each of said first means steps.

4. Apparatus according to claim 3 in which said inward deformation of said crimp sleeve is effected at least at one pair of diametrically opposite locations.

5. Apparatus according to claim 1 in which said inward deformation of said crimp sleeve is effected in an arc within the perimeter of said crimp sleeve.

6. Apparatus according to claim 5 in which said arc is substantially 360°, whereby said inward deformation grips the corresponding first means step about its entire perimeter.

7. Apparatus according to claim 1 in which said crimp sleeve is of a malleable metal.

8. Apparatus according to claim 1 in which said eccentric sleeve members are made of close fitting plastic material having lubricious surfaces to facilitate rotation for adjustment prior to inward deformation of said crimp sleeve to lock said eccentric sleeves in selected rotational positions.

9. Apparatus according to claim 8 in which said inward deformation of said crimp sleeve is effected at least at one location about the perimeter of said crimp sleeve corresponding to each of said first means steps.

10. Apparatus according to claim 6 in which said eccentric sleeve members are made of close fitting plastic material having lubricious surfaces to facilitate rotation for adjustment prior to inward deformation of said crimp sleeve to lock said eccentric sleeves in selected rotational positions.

* * * * *